US008911015B2

(12) United States Patent
Cohen et al.

(10) Patent No.: US 8,911,015 B2
(45) Date of Patent: Dec. 16, 2014

(54) CAR SEAT

(71) Applicant: Yochanan Cohen, New York, NY (US)

(72) Inventors: Yochanan Cohen, New York, NY (US);
Velissa Van Scoyoc, Pottstown, PA (US)

(73) Assignee: Yochanan Cohen, New York, NY (US)

( * ) Notice: Subject to any disclaimer, the term of this patent is extended or adjusted under 35 U.S.C. 154(b) by 113 days.

(21) Appl. No.: 13/785,555

(22) Filed: Mar. 5, 2013

(65) Prior Publication Data

US 2014/0252814 A1    Sep. 11, 2014

(51) Int. Cl.
*B60N 2/28*    (2006.01)
*B60N 2/26*    (2006.01)

(52) U.S. Cl.
CPC ..................................... *B60N 2/265* (2013.01)
USPC ................................ 297/256.16; 297/216.11

(58) Field of Classification Search
USPC ......... 297/250.1, 216.1, 256, 256.13, 256.16, 297/216.11, 216.13, 216.14, 216.15
See application file for complete search history.

(56) References Cited

U.S. PATENT DOCUMENTS

| | | | |
|---|---|---|---|
| 3,174,155 A | 3/1965 | Pitman | |
| 3,186,004 A | 6/1965 | Carlini | |
| 3,320,619 A | 5/1967 | Latsnik et al. | |
| 3,577,562 A | 5/1971 | Holt | |
| 3,818,508 A | 6/1974 | Lammers | |
| 3,906,546 A | 9/1975 | Gooding | |
| 4,101,983 A | 7/1978 | Dera et al. | |
| 4,345,338 A | 8/1982 | Frieder, Jr. et al. | |
| 4,484,364 A | 11/1984 | Mitchell et al. | |
| 4,599,752 A | 7/1986 | Mitchell | |
| 4,845,786 A | 7/1989 | Chiarella | |
| 4,937,888 A | 7/1990 | Straus | |
| 4,972,527 A | 11/1990 | Wallace | |
| 5,018,220 A | 5/1991 | Lane et al. | |
| 5,204,998 A | 4/1993 | Liu | |
| 5,259,071 A | 11/1993 | Scott et al. | |
| 5,409,294 A | 4/1995 | Czernakowski | |
| 5,466,044 A | 11/1995 | Barley et al. | |

(Continued)

FOREIGN PATENT DOCUMENTS

EP         1953035    *  8/2008

OTHER PUBLICATIONS

Children, NHTSA Traffic Safety Facts, 2003, National Center for Statistics and Analysis, DOT HS 809 762.

(Continued)

*Primary Examiner* — William Gilbert
(74) *Attorney, Agent, or Firm* — Gordon & Jacobson, PC

(57) ABSTRACT

Embodiments of a highly protective, safe and strong car seat are disclosed and include an outer protective shell, an inner seat, a suspension system connecting and permitting relative movement between the inner seat and the outer protective shell, and a harness adapted to hold an occupant to the inner seat and not attached to the outer protective shell. In the case of an accident, regardless of the direction in which the seat is facing and regardless of whether the result is a sudden acceleration and/or deceleration, the inner seat will move inside the frame, and the suspension system will absorb some, much, or all of the energy. Energy not absorbed by the suspension system may be absorbed by the inner seat itself. The frame is of extremely high strength and will remain structurally intact in almost all circumstances thereby protecting the occupant of the car seat.

19 Claims, 5 Drawing Sheets

(56) References Cited

U.S. PATENT DOCUMENTS

| | | |
|---|---|---|
| 5,475,878 A | 12/1995 | Dawn et al. |
| 5,611,596 A | 3/1997 | Barley et al. |
| 5,630,645 A | 5/1997 | Lumley et al. |
| 5,680,656 A | 10/1997 | Gath |
| 5,724,681 A | 3/1998 | Sykes |
| 5,845,968 A | 12/1998 | Lovie |
| 5,916,828 A | 6/1999 | Messner |
| 5,930,840 A | 8/1999 | Arai |
| 5,947,552 A | 9/1999 | Wilkins et al. |
| 5,951,102 A | 9/1999 | Poulson et al. |
| 5,956,777 A | 9/1999 | Popovich |
| 5,961,180 A | 10/1999 | Greger et al. |
| 5,997,086 A | 12/1999 | Gibson et al. |
| 5,997,098 A | 12/1999 | Coffeen |
| 6,017,088 A | 1/2000 | Stephens et al. |
| 6,027,163 A | 2/2000 | Longenecker |
| 6,032,297 A | 3/2000 | Barthold et al. |
| 6,048,028 A | 4/2000 | Bapst |
| 6,070,890 A | 6/2000 | Haut et al. |
| 6,079,780 A | 6/2000 | Bapst |
| 6,082,814 A | 7/2000 | Celestina-Krevh et al. |
| 6,139,101 A | 10/2000 | Berringer et al. |
| 6,155,638 A | 12/2000 | Bapst |
| 6,161,847 A | 12/2000 | Howell et al. |
| 6,170,910 B1 | 1/2001 | Bapst |
| 6,272,692 B1 | 8/2001 | Abraham |
| 6,319,138 B1 | 11/2001 | Fair et al. |
| 6,325,454 B1 | 12/2001 | Maier |
| 6,331,032 B1 | 12/2001 | Haut et al. |
| 6,367,875 B1 | 4/2002 | Bapst |
| 6,389,607 B1 | 5/2002 | Wood |
| 6,409,205 B1 | 6/2002 | Bapst et al. |
| 6,421,840 B1 | 7/2002 | Chen et al. |
| 6,428,099 B1 * | 8/2002 | Kain .................... 297/256.1 |
| 6,431,647 B2 | 8/2002 | Yamazaki |
| 6,450,576 B1 | 9/2002 | Rhein et al. |
| 6,457,774 B2 | 10/2002 | Baloga |
| 6,471,298 B2 | 10/2002 | Carine et al. |
| 6,474,735 B1 | 11/2002 | Carnahan et al. |
| 6,513,827 B1 | 2/2003 | Barenbrug |
| 6,540,292 B2 | 4/2003 | Darling et al. |
| 6,540,579 B1 | 4/2003 | Gubitosi et al. |
| 6,561,915 B2 | 5/2003 | Kelly et al. |
| 6,623,074 B2 | 9/2003 | Asbach et al. |
| 6,626,489 B2 | 9/2003 | Geis et al. |
| 6,629,727 B2 | 10/2003 | Asbach et al. |
| 6,634,708 B2 * | 10/2003 | Guenther ................ 297/216.11 |
| 6,666,505 B2 | 12/2003 | Greger et al. |
| 6,669,302 B2 | 12/2003 | Warner, Jr. et al. |
| 6,679,550 B2 | 1/2004 | Goor et al. |
| 6,695,412 B2 | 2/2004 | Barger et al. |
| 6,705,675 B1 | 3/2004 | Eastman et al. |
| 6,705,676 B1 | 3/2004 | Berringer et al. |
| 6,709,062 B2 | 3/2004 | Shah |
| 6,746,080 B2 | 6/2004 | Tsugimatsu et al. |
| 6,749,258 B1 | 6/2004 | Leikin |
| 6,764,133 B2 | 7/2004 | Osato |
| 6,811,217 B2 | 11/2004 | Kane et al. |
| 6,857,965 B2 | 2/2005 | Pook et al. |
| 6,877,801 B2 | 4/2005 | Asbach et al. |
| 6,877,802 B2 | 4/2005 | Christensen et al. |
| 6,877,809 B2 | 4/2005 | Yamazaki et al. |
| 6,887,161 B2 | 5/2005 | Mahlstedt et al. |
| 6,896,575 B2 | 5/2005 | Fair et al. |
| 6,912,736 B2 | 7/2005 | Moeller et al. |
| 6,926,359 B2 | 8/2005 | Runk |
| 6,931,671 B2 | 8/2005 | Skiba |
| 6,932,709 B1 | 8/2005 | Gubitosi et al. |
| 7,017,921 B2 | 3/2006 | Eros |
| 7,044,548 B2 | 5/2006 | Mullen et al. |
| 7,044,549 B2 | 5/2006 | Maier et al. |
| 7,062,795 B2 | 6/2006 | Skiba et al. |
| 7,066,536 B2 | 6/2006 | Williams et al. |
| 7,188,897 B2 | 3/2007 | Patrizi et al. |
| 7,195,314 B2 | 3/2007 | Spence et al. |
| 7,201,444 B2 | 4/2007 | Schimmoller et al. |
| 7,207,628 B2 | 4/2007 | Eros |
| 7,234,771 B2 | 6/2007 | Nakhla |
| 7,244,165 B2 | 7/2007 | Gubitosi et al. |
| 7,246,855 B2 | 7/2007 | Langmaid et al. |
| 7,252,342 B2 | 8/2007 | Patrizi et al. |
| 7,270,373 B2 | 9/2007 | Sakumoto |
| 7,278,683 B2 | 10/2007 | Williams et al. |
| 7,322,648 B2 | 1/2008 | Nakagawa et al. |
| 7,325,871 B2 | 2/2008 | Gangadharan et al. |
| 7,325,872 B2 | 2/2008 | Basu et al. |
| 7,328,462 B1 | 2/2008 | Straus |
| 7,328,941 B2 | 2/2008 | Asbach et al. |
| 7,338,122 B2 | 3/2008 | Hei et al. |
| 7,370,912 B2 | 5/2008 | Williams et al. |
| 7,387,336 B2 | 6/2008 | Sakumoto |
| 7,438,644 B2 | 10/2008 | Gubitosi et al. |
| 7,445,228 B2 | 11/2008 | Henry |
| 7,445,559 B2 | 11/2008 | Kakuda |
| 7,452,031 B2 | 11/2008 | Woellert et al. |
| 7,455,353 B2 | 11/2008 | Favorito (nee Wilkins) et al. |
| 7,467,824 B2 | 12/2008 | Nakhla et al. |
| 7,472,952 B2 | 1/2009 | Nakhla et al. |
| 7,472,955 B2 | 1/2009 | Crane et al. |
| 7,484,801 B2 | 2/2009 | Kassai et al. |
| 7,488,034 B2 | 2/2009 | Ohren et al. |
| 7,497,449 B2 | 3/2009 | Logger |
| 7,506,926 B2 | 3/2009 | Carine |
| 7,523,984 B2 | 4/2009 | Steininger |
| 7,536,731 B1 | 5/2009 | Feldman |
| 7,552,969 B2 | 6/2009 | Maciejczyk |
| 7,559,606 B2 | 7/2009 | Hei et al. |
| 7,597,396 B2 | 10/2009 | Longenecker et al. |
| 7,607,734 B2 | 10/2009 | Clapper et al. |
| 7,648,199 B2 | 1/2010 | Amesar et al. |
| RE41,121 E | 2/2010 | Asbach et al. |
| 7,676,854 B2 | 3/2010 | Berger et al. |
| 7,695,374 B2 | 4/2010 | Bellows et al. |
| 7,717,506 B2 | 5/2010 | Amesar et al. |
| 7,722,118 B2 | 5/2010 | Bapst et al. |
| 7,726,734 B2 | 6/2010 | Mahal et al. |
| 7,740,313 B1 | 6/2010 | Hei et al. |
| 7,765,621 B2 | 8/2010 | Lardeau |
| 7,765,622 B2 | 8/2010 | Wiles |
| 7,770,970 B2 | 8/2010 | Hei et al. |
| 7,770,971 B2 | 8/2010 | Bellows et al. |
| 7,798,500 B2 | 9/2010 | Den Boer |
| 7,798,571 B2 | 9/2010 | Billman et al. |
| 7,802,321 B2 | 9/2010 | Boyd |
| 7,806,471 B2 | 10/2010 | Nishimoto |
| 7,806,472 B2 | 10/2010 | Runk et al. |
| 7,810,682 B2 * | 10/2010 | Balensiefer et al. .......... 224/158 |
| 7,832,023 B2 | 11/2010 | Crisco |
| 7,837,275 B2 | 11/2010 | Woellert et al. |
| 7,841,657 B2 | 11/2010 | Nishimoto et al. |
| 7,871,125 B2 | 1/2011 | Asbach et al. |
| 7,887,129 B2 | 2/2011 | Hei et al. |
| 7,891,732 B2 | 2/2011 | Hei et al. |
| 7,930,771 B2 | 4/2011 | Depreitere et al. |
| 7,938,731 B2 | 5/2011 | Papageorge et al. |
| 7,954,895 B2 | 6/2011 | Freeman et al. |
| 7,967,376 B2 | 6/2011 | Przybylo et al. |
| 7,987,525 B2 | 8/2011 | Summers et al. |
| 8,029,014 B2 | 10/2011 | Ahnert et al. |
| 8,047,608 B2 | 11/2011 | Damiani et al. |
| 8,056,975 B2 | 11/2011 | Longenecker et al. |
| 8,070,226 B2 | 12/2011 | Dingler et al. |
| 8,070,227 B2 | 12/2011 | Brunick et al. |
| 8,087,680 B2 | 1/2012 | Dotsey et al. |
| 8,147,345 B2 | 4/2012 | Furman |
| 8,166,573 B1 | 5/2012 | Chung et al. |
| 8,182,033 B2 | 5/2012 | Hei et al. |
| 8,182,355 B2 | 5/2012 | Bapst |
| 8,197,005 B2 | 6/2012 | Hopke et al. |
| 8,205,940 B2 | 6/2012 | Mahal et al. |
| 8,209,784 B2 | 7/2012 | Nimmons et al. |
| 8,210,610 B2 | 7/2012 | Berkey et al. |
| 8,235,465 B2 | 8/2012 | Hei et al. |
| 8,240,772 B2 | 8/2012 | Kawata et al. |

(56) References Cited

U.S. PATENT DOCUMENTS

| | | |
|---|---|---|
| 8,256,840 B2 | 9/2012 | Dasent et al. |
| 8,256,841 B2 | 9/2012 | Hei et al. |
| 8,286,990 B2 | 10/2012 | Tanizaki et al. |
| 8,297,694 B2 | 10/2012 | Arnold, IV et al. |
| 8,308,239 B2 | 11/2012 | Lundeen |
| 8,348,337 B2 | 1/2013 | Franck et al. |
| 8,388,058 B2 | 3/2013 | Krasley |
| 8,393,679 B2 | 3/2013 | Longenecker et al. |
| 8,408,656 B2 | 4/2013 | Carpenter |
| 8,419,129 B2 | 4/2013 | Inoue et al. |
| 8,424,964 B2 | 4/2013 | Campbell et al. |
| 8,430,452 B2 | 4/2013 | Brunick et al. |
| 8,434,827 B2 | 5/2013 | Young et al. |
| 8,449,030 B2 | 5/2013 | Powell et al. |
| 8,459,739 B2 | 6/2013 | Tamanouchi et al. |
| 8,474,907 B2 | 7/2013 | Weber et al. |
| 8,491,401 B2 | 7/2013 | Szymanski |
| 8,500,196 B2 | 8/2013 | Strong et al. |
| 8,511,749 B2 | 8/2013 | Hei et al. |
| 8,534,751 B2 | 9/2013 | Hei et al. |
| 8,540,312 B2 | 9/2013 | Asbach et al. |
| 8,550,556 B2 | 10/2013 | Asbach |
| 8,556,349 B2 | 10/2013 | Welch et al. |
| 8,622,478 B2 | 1/2014 | Spence |
| 8,632,127 B2 | 1/2014 | Brunick et al. |
| 8,684,456 B2 | 4/2014 | Powell |
| 8,690,237 B2 | 4/2014 | Allen |
| 2004/0250339 A1 | 12/2004 | Musal |
| 2004/0255370 A1 | 12/2004 | Moeller |
| 2005/0278834 A1 | 12/2005 | Lee |
| 2006/0059605 A1 | 3/2006 | Ferrara |
| 2006/0059606 A1 | 3/2006 | Ferrara |
| 2006/0162053 A1 | 7/2006 | Lee |
| 2006/0242752 A1 | 11/2006 | Talluri |
| 2006/0277664 A1 | 12/2006 | Akhtar |
| 2007/0040428 A1 | 2/2007 | Sakumoto |
| 2007/0046086 A1 | 3/2007 | Sakumoto |
| 2007/0068282 A1 | 3/2007 | Nakagawa et al. |
| 2007/0080568 A1 | 4/2007 | Nakagawa et al. |
| 2007/0107112 A1 | 5/2007 | Boyd |
| 2007/0119538 A1 | 5/2007 | Price |
| 2007/0130673 A1 | 6/2007 | Wasserkrug |
| 2007/0157370 A1 | 7/2007 | Joubert Des Ouches |
| 2007/0226881 A1 | 10/2007 | Reinhard et al. |
| 2008/0222782 A1 | 9/2008 | Stokes |
| 2009/0026815 A1 | 1/2009 | Amesar et al. |
| 2009/0222964 A1 | 9/2009 | Wiles |
| 2009/0315299 A1 | 12/2009 | Barenbrug |
| 2011/0047678 A1 | 3/2011 | Barth et al. |
| 2011/0107503 A1 | 5/2011 | Morgan |
| 2011/0179557 A1 | 7/2011 | Rabie |
| 2011/0272925 A1 | 11/2011 | Dijkstra |
| 2012/0013157 A1 | 1/2012 | Keegan et al. |
| 2012/0060251 A1 | 3/2012 | Schimpf |
| 2012/0151663 A1 | 6/2012 | Rumbaugh |
| 2012/0186002 A1 | 7/2012 | Bhatnagar et al. |
| 2012/0216339 A1 | 8/2012 | Nimmons et al. |
| 2012/0233745 A1 | 9/2012 | Veazie |
| 2013/0125294 A1 | 5/2013 | Ferrara |
| 2013/0340147 A1 | 12/2013 | Giles |

OTHER PUBLICATIONS

Children Injured in Motor Vehicle Traffic Crashes, NHTSA, May 2010, DOT HS 811 325.
U.S. Appl. No. 14/197,855, filed Mar. 5, 2014, Cohen et al.
U.S. Appl. No. 62/043,947, filed Aug. 29, 2014, Cohen et al.
U.S. Appl. No. 62/043,955, filed Aug. 29, 2014, Cohen et al.
Helmets Preventing Concussion Seen Quashed by NFL-Riddell, John Helyar, Mar. 18, 2013, Bloomberg.

* cited by examiner

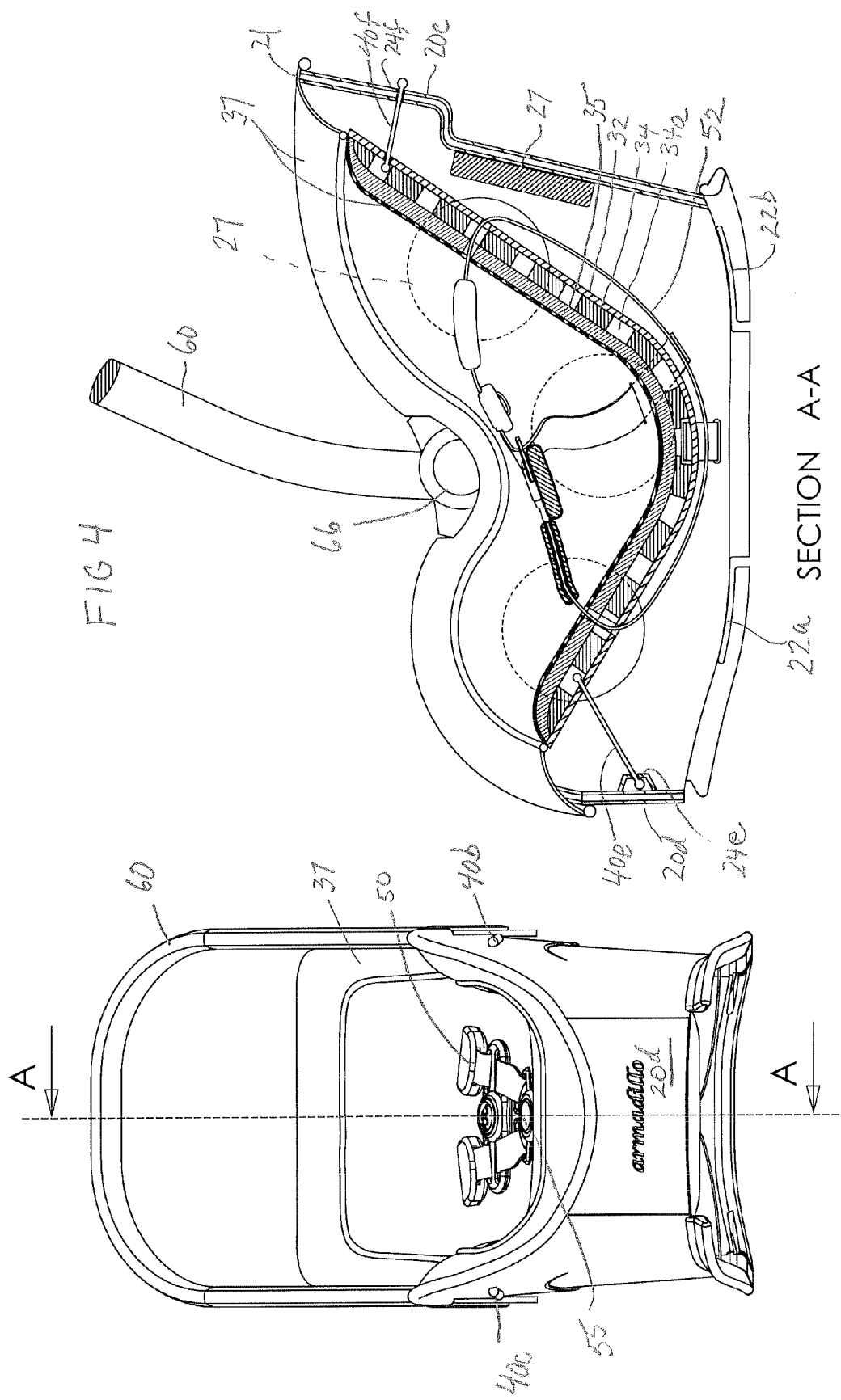

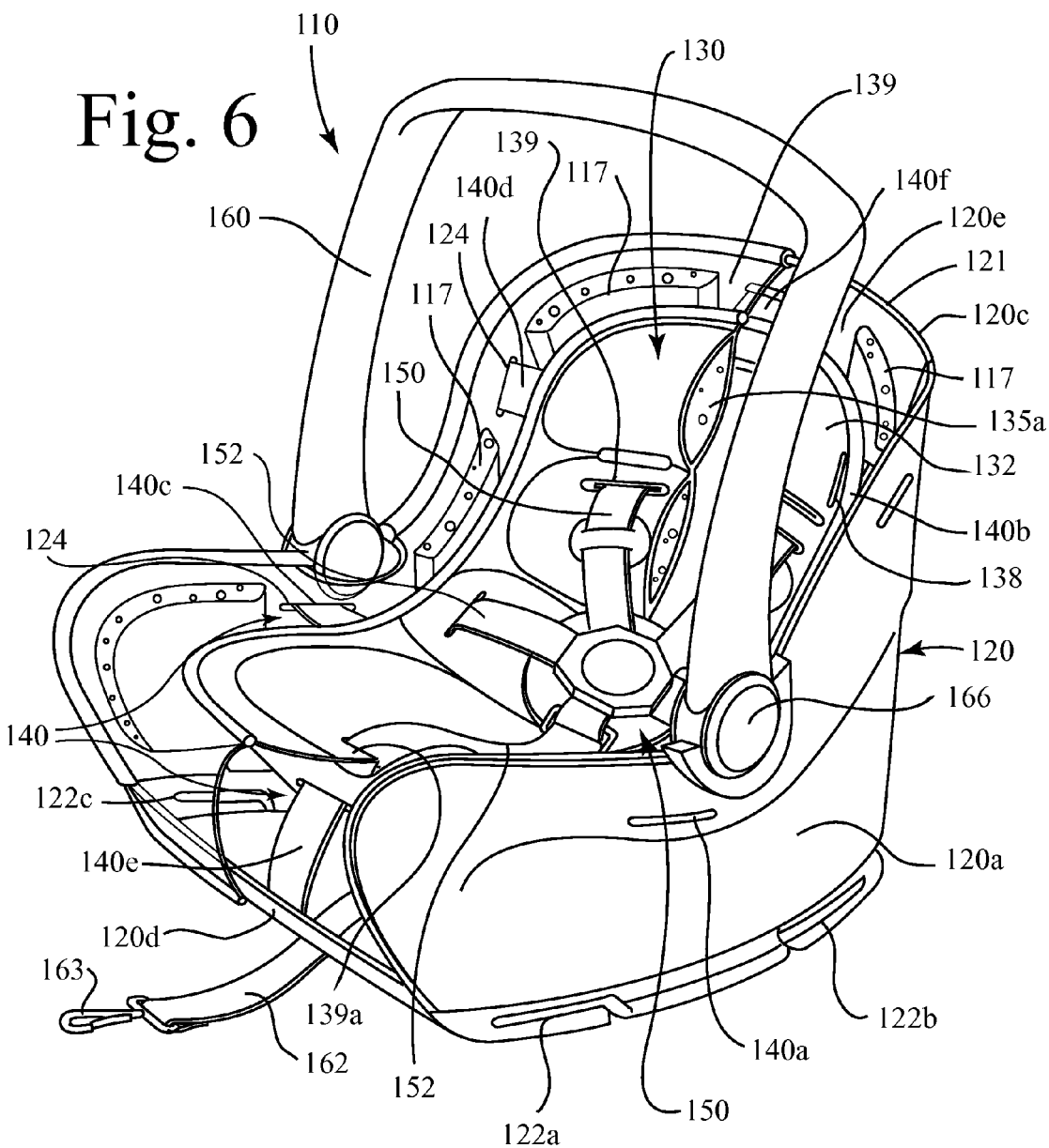

CAR SEAT

BACKGROUND

1. Field

The present disclosure relates to car seats. More particularly, the present disclosure relates to safety car seats. The safety car seats may be for infants or children, although this application is not limited thereto.

2. State of the Art

The most common cause of death for children aged 1-5 in developed countries is by accident, and the leading cause of death by accident is due to car accidents. When properly installed in passenger cars, child safety seats have been reported to reduce fatal injury by about 71% for children under age one and by about 54% for toddlers aged 1-4. Nonetheless, in the U.S. alone, over 250 children aged 0-4 are fatally injured every year while properly restrained in their car seats.

In addition, to the fatalities, every year, thousands of children who are properly restrained in car seats still sustain incapacitating injuries resulting from car accidents. By far the most common severe injuries are head injuries, including cerebrum injuries (contusions or lacerations), concussions, skull vault and skull base fractures, subarachnoid hemorrhages, and subdural hematomas. Other common severe injuries are thoracic (lung and rib), abdominal (bowel, liver, spleen, kidney), spine, and upper extremity (clavicle, humerus, radius/ulna) and lower extremity (pelvis, femur, tibia/fibula) injuries. The injury outcome in children can be worse than similar injuries sustained by adults, and children who suffer traumatic brain injuries can experience lasting or late-appearing neuropsychological problems. For example, frontal lobe functions develop relatively late in a child's growth, so that injury to the frontal lobes may not become apparent until the child reaches adolescence.

According to the U.S. National Highway Traffic and Safety Administration (NHTSA), children under the age of one should always ride in a rear-facing car seat that has a harness. While it is recommended that rear-facing seats be used as long as possible, it is recognized that children aged 1 and over will wish to face forward. NHTSA recommends that children aged 1-3 (and older if they have not reached a certain height and weight) use a forward-facing car seat with a harness and tether that limits the child's forward movement during a crash.

There are many types of car seats available for purchase. Infant seats recommended for children under age 1 are typically rear-facing. Many include a base that is belted or tethered into the car and a seat that can latch into the base. The seat often includes a handle so that the seat may be carried when it is unlatched from the base (i.e., from the car). A popular car seat option for infants as well as children is a "convertible" car seat that may be oriented in a rear-facing position and the "converted" to a front-facing position. Some convertible car seats may even convert into a booster seat for children weighing up to 100 pounds. Typically the convertible car seats are strapped into the car using the car seat-belt, or are anchored to the car frame directly using a LATCH (Lower anchors and Tethers for children) system. All car seats offer a harness for strapping the child into the seat. The usual harness is a five-point safety harness. The car seats tend to be formed from injection molded plastic, typically at least 5 mm thick, and the seats (with base in the case of the infant seats) typically weight 7 kgs or more.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A car seat includes an outer protective shell or frame, an inner seat, a harness, and a suspension system. The protective shell or frame is adapted to be strapped or anchored to the car frame. The inner seat is connected to the protective shell or frame by the suspension system such that the inner seat can move (float) a small amount relative to the protective shell. The harness is not attached to the outer protective shell or frame, but extends through slots in the inner seat and keeps the passenger in the inner seat.

In one embodiment, the suspension system is a seven point suspension system. The seven point suspension system may include seven webs or belts, most or all of which are between 0.75 and 3 inches long that are used to suspend the inner seat relative to the outer frame. In one embodiment, respective slots are provided in the outer frame and the an outer shell of the inner seat through which the webs extend, and the respective ends of each web are either sewn on themselves or sewn around a stick or other object so that the end is too thick to pull through the slots.

In one embodiment, the outer protective shell or frame is a multilayered construction of strong, light material.

In one embodiment, the inner seat is a protective seat made from a multi-layered construction. In one embodiment the multi-layered construction of the inner seat includes (from outside to inside) a flexible hard outer shell, a cushioning spacer layer, a uniform foam layer, and an optional fabric or leather layer. The cushioning spacer layer does not cover the entire inside of the hard outer shell nor the entire outside of the uniform foam layer. The inner seat construction is arranged to redirect energy transmitted from the outer shell along a circuitous path.

In one embodiment, the multiple layers of the inner seat have slots through which harness belts extend. In one embodiment a five-point harness has several belts that are attached to each other and wrap around the inner seat.

In one embodiment, a removable fabric cover may be used to cover the inside of the inner seat and the space between the inner seat and the outer frame.

BRIEF DESCRIPTION OF THE DRAWINGS

FIG. 3 is a front view of the car seat of FIG. 1.

FIG. 4 is a cross-sectional view of the car seat of FIG. 1 taken at A-A of FIG. 3.

FIG. 6 is a perspective, partially cut-away, partially transparent view of another embodiment of a car seat.

DETAILED DESCRIPTION

Figure 1:
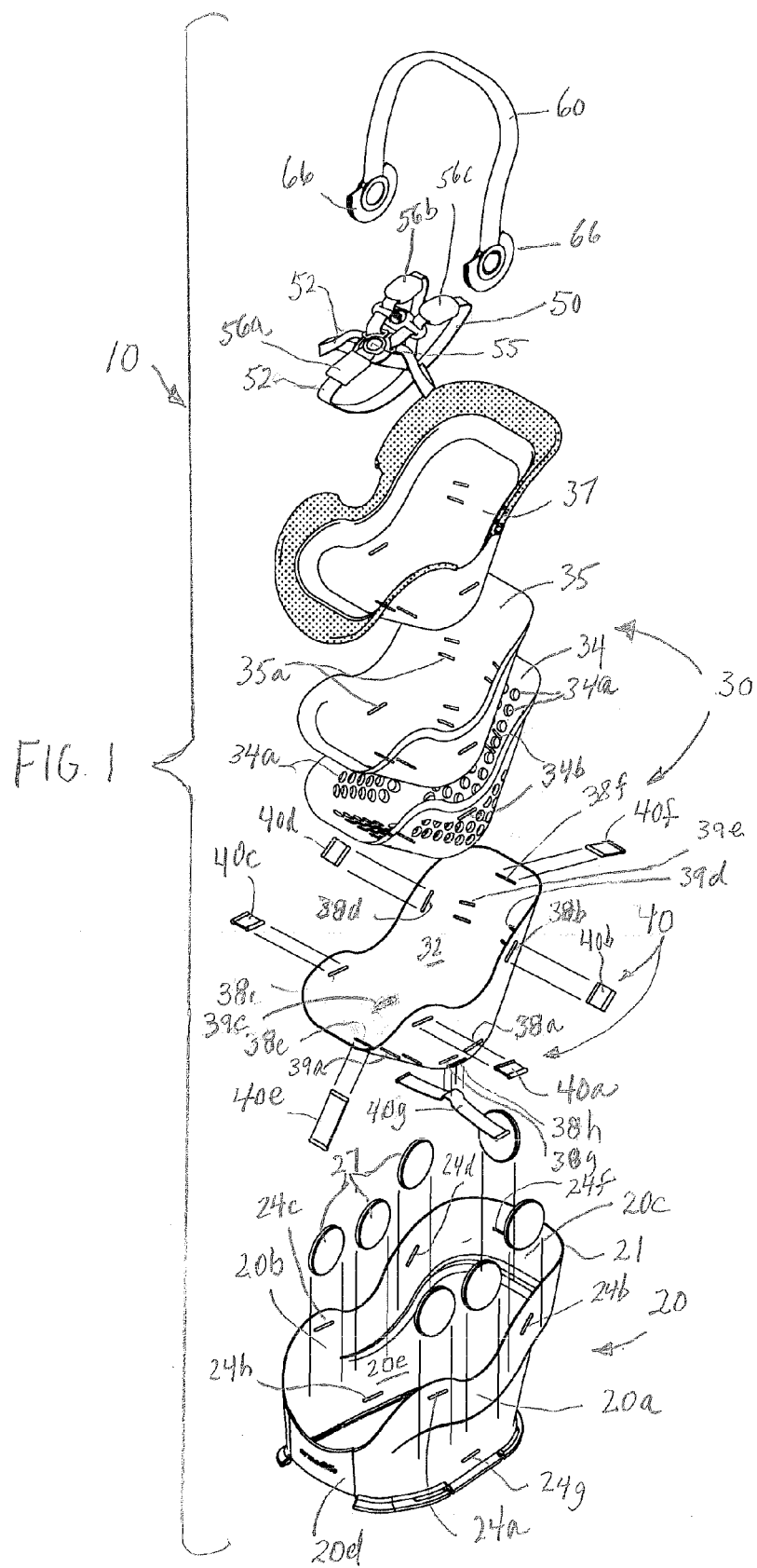
FIG. 1 is an exploded view of a car seat.
Figure 2:
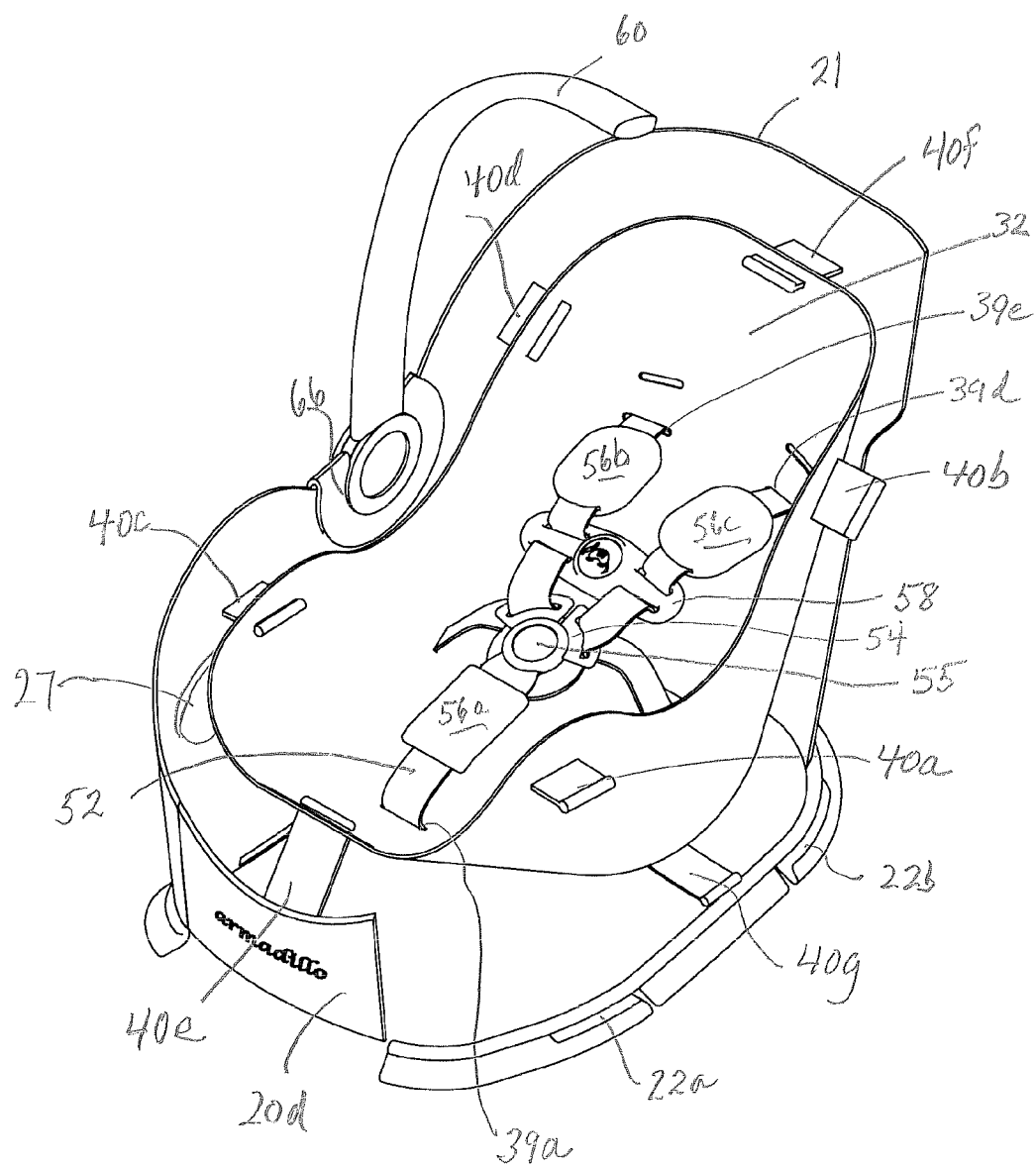
FIG. 2 is a perspective, partially broken view of the car seat of FIG. 1 without the removable fabric cover and inner seat layers.
Figure 5:
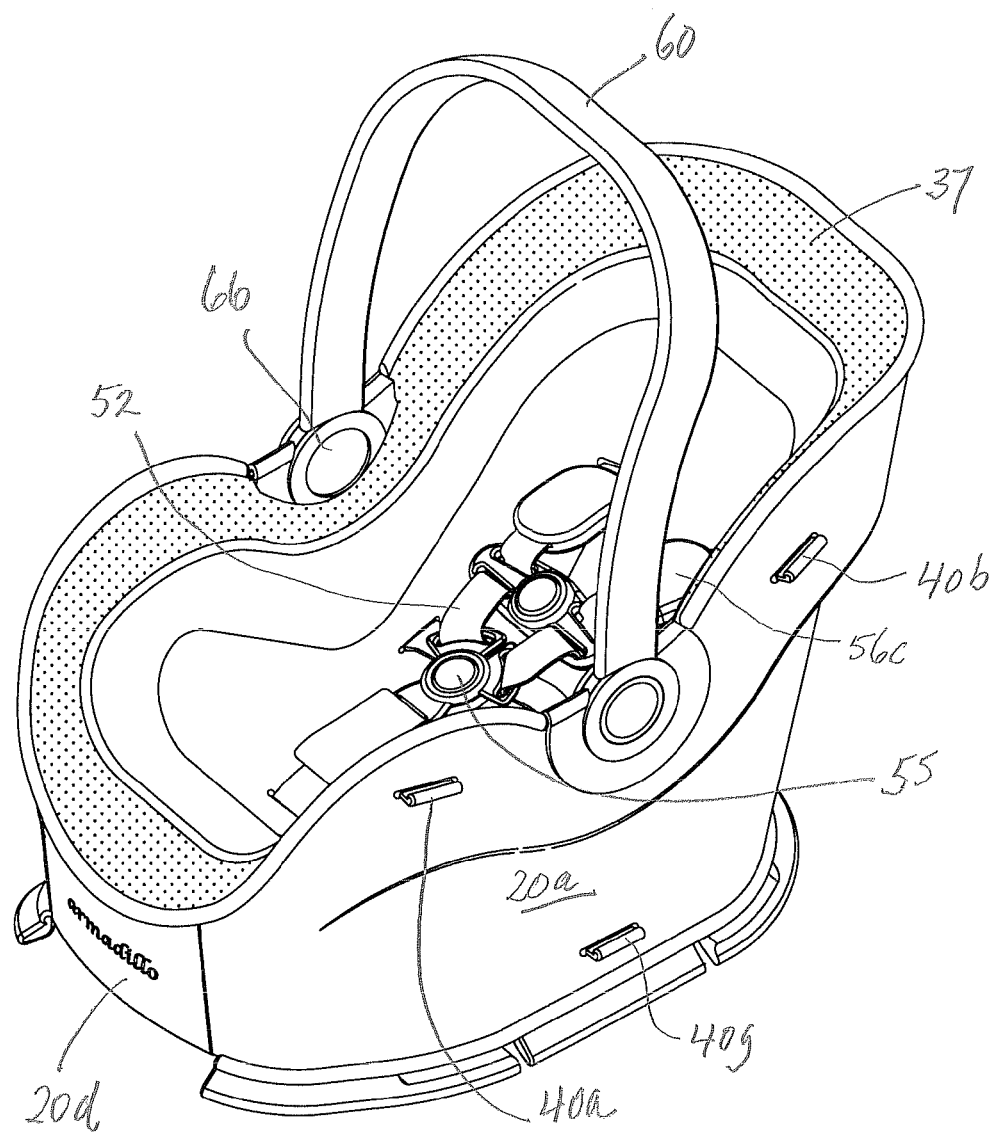
FIG. 5 is a perspective view of the car seat of FIG. 1.

One embodiment of a car seat 10 is seen in FIGS. 1-5. Car seat 10 includes a an outer protective shell 20, an inner seat 30, a suspension system 40 and a harness 50. The protective shell 20 is adapted as described below to be strapped or anchored to a car frame (not shown). The inner seat 30 is connected to the protective shell 20 by the suspension system 40 such that the inner seat can move (float) a small amount relative to the protective shell 20 as described below. Thus, the outer shell 20 provides support for the seat 30 (via the suspension system 40) but is not rigidly attached thereto. The harness 50 extends through and around the inner seat 30 and is not attached to the outer protective shell 20. A handle 60 connected to the shell 20 is optionally provided.

In one embodiment, the outer protective shell or frame 20 is made from a strong, light material such as carbon fiber or an aramid fiber such as KEVLAR (a trademark of DuPont, Wilmington, Delaware), or any other strong, light material. In one embodiment, the shell 20 is constructed of multiple layers of carbon fiber, aramid fiber or a composite material. In another embodiment, the outer protective shell is formed from two separated layers of carbon fiber, aramid fiber or composite material (as seen, e.g., in FIG. 4) sandwiching a honeycomb, foam, or corrugated material (not shown). In other embodiments, the shell 20 is constructed of one or more of polycarbonate, polypropylene, ABS resin, and fiberglass. One function of the shell 20 is to provide support for the seat 30 via the suspension system 40. Another function of the shell 20 is to provide protection from intrusion by exterior objects.

In one embodiment the shell 20 provides side and back walls 20a-20c and a front wall 20d that connects the side walls 20a, 20b at the front of the car seat. The back wall 20c provides a high back compared to the front wall 20d which is low. The side walls are contoured to extend from the back to the front. The front, back and side walls provide an upper edge 21 to which or over which a seat cover may be attached as described hereinafter. All walls may be rounded to eliminate edges so there may be no exact delineation of the front, side, and back walls.

As seen in FIGS. 1-5, the side walls 20a, 20b define fore and aft slots 22a, 22b (two more slots not shown) for receiving a seat belt therethrough, thereby permitting the car seat 10 to be strapped in facing forwards or backwards. If desired a belt (not shown) may be provided having one end attached to the shell 20 and a hook (not shown) located at the other end. The hook may be used to connect to the frame of the car (not shown) located under the car's seat cushion (not shown). In another embodiment, the shell 20 may be adapted to rigidly connect to a separate base that can be strapped or anchored in place in the car. In another embodiment, the shell 20 may be adapted so that hooks from the car (not shown) can attach to the shell 20.

Shell 20 also defines a series of slots 24 for receiving the belts 40a-40g of the suspension system 40. In the embodiment shown, eight slots 24a-24h are provided, including two slots each (24a-24d) towards the top of side walls 20a, 20b, a single slot 24e in the bottom of the front wall 20d of the car seat (see FIG. 4), a single slot 24f in the top of the back wall 20c, and a single slot each 24g, 24h toward the bottom of the side walls 20a, 20b. Belts 40a-40g, as described in more detail below, couple the shell 20 to the inner seat 30. It will be appreciated that if it is desired that the belts not be seen from the outside, the slots are built into the inner side of the wall as shown for slot 24e of FIG. 4. Otherwise, the slots may extend through the walls of the shell 20 as seen with respect to slots 24a-24d, 24f-24h. For purposes herein, a "slot" in a wall may be considered a through-slot, or a hook or catch that allows attachment for the belt or attachment device to the shell 20.

In one embodiment, shell 20 also defines holes or slots (not shown) for receiving a connection mechanism or support 66 for a handle 60.

In one embodiment, a plurality of optional padding elements 27 are spaced around the inside surface 20e of the shell 20. The padding elements 27 are located such that should the shell 20 be subjected to significant forces and movement relative to the seat 30, the padding elements 27 will contact the seat 30 and largely prevent the inside surface 20e of the shell 20 from contacting the seat 30. The padding elements 27 may be formed from an elastomeric, cellular foam or any other desirable foam. In another embodiment, the padding elements are comprised of thermoplastic polyurethane (TPU). In another embodiment, the pads 27 are comprised of open-cell polyurethane. In another embodiment, the pads are comprised of closed cell polyolefin foam. In another embodiment, the pads are comprised of polyethylene foam which may be a high density polyethylene foam. In one embodiment the padding elements 27 are formed as a single pad defining multiple cut-outs (i.e., the equivalent of multiple connected pads). Regardless, the single pad with the cut-outs or the multiple pads 27 are arranged in a desired configuration and are affixed to the inner surface 20e of the shell. Affixation can be done with glue, Velcro or any other affixation means. By way of example, and not by way of limitation, the innermost cushioning pads may have a density of between 3.4 lbs/ft$^3$ (approximately 0.016 g/cm$^3$) and 25 lbs/ft$^3$ (approximately 0.4 g/cm$^3$), although they may be more dense or less dense.

The outer dimensions of the shell 20 may vary widely. The shell 20 may be between 40 and 70 cm wide, or even narrower or wider, and between 20 and 60 cm deep, or even shallower or deeper, and between 50 and 80 cm high, or even shorter or taller. In one exemplary embodiment the outer dimensions of the shell is 50 cm wide (plus or minus 5 cm), 28 cm deep (plus or minus 3 cm), and 68 cm high (plus or minus 7 cm).

The inner seat 30 is scooped in shape with a relatively high back, a deep seat area (for the buttocks), and a slightly rising surface for the thighs and legs. In one embodiment, the inner seat 30 is a protective seat made from a multi-layered construction. In one embodiment. the inner seat includes a flexible hard outer shell layer 32, a cushioning spacer layer 34, and uniform foam layer 35, and an attached fabric or leather layer 37. The cushioning spacer layer 34 does not cover the entire inside of the hard outer shell layer 32 nor the entire outside of the uniform foam layer 35. The fabric or leather layer 37 can extends beyond the inner seat 30 and attaches to the edge 21 of the shell 20 but does not inhibit seat 30 from moving relative to the shell 20. In another embodiment the multi-layered construction of the inner seat includes (from outside to inside) a hard outer shell layer 32, a cushioning spacer layer 34, and a uniform foam layer 35. An optional plastic, leather, or fabric layer (not shown) may be provided over the foam layer 35. A separate removable seat cover can be provided that extends over the seat 30 and attaches to the edge 21 of the shell 20. Again, the separate removable seat cover would not inhibit seat 30 from moving relative to the shell 20. The inner seat construction is arranged to redirect energy transmitted from the outer shell along a circuitous path so as to absorb the energy. The inner seat 30 also defines a plurality of (e.g., eight) slots 38a-38h for receiving belts 40a-40g of the suspension system 40, and a series of slots 39a-39e for receiving belts 52 of harness 50.

In one embodiment, the hard outer shell layer 32 of inner seat 30 is comprised of a polycarbonate shell. In another embodiment, the hard outer shell 32 is comprised of a different hard plastic such a polypropylene. In another embodiment, the hard outer shell 32 is comprised of ABS resin. In another embodiment, the hard outer shell layer 32 is made of carbon fiber or fiberglass.

In one embodiment, the cushioning spacer layer 34 of inner seat 30 includes multiple spaced pads. In another embodiment, the cushioning spacer layer 34 comprises a single pad defining multiple cut-outs 34a (i.e., the equivalent of multiple connected pads). In one embodiment the cushioning spacer layer 34 is comprised of foam. The foam may be an elastomeric cellular foam or any other desirable foam. In another embodiment, the cushioning spacer layer is comprised of thermoplastic polyurethane (TPU). In another embodiment, the cushioning spacer layer is comprised of open-cell polyurethane. In another embodiment, the cushioning spacer layer is comprised of closed cell polyolefin foam. In another embodiment, the cushioning spacer layer is comprised of polyethylene foam which may be a high density polyethylene foam. In another embodiment, the cushioning spacer layer 34 has multiple layers formed from different materials. By way of example and not by way of limitation, the cushioning spacer layer may be between 3 mm and 26 mm thick, although it may be thinner or thicker. As another example, the cushioning spacer layer may be between 6 and 13 mm thick. By way of example, and not by way of limitation, the cushioning spacer layer may have a density of between 3.4 lbs/ft$^3$ (approximately 0.016 g/cm$^3$) and 25 lbs/ft$^3$ (approximately 0.4 g/cm$^3$), although it may be more dense or less dense.

According to one embodiment, the cushioning spacer layer 34 covers approximately fifty percent of the inner surface area of the hard outer shell 32. In another embodiment, the spacer layer 34 covers between twenty percent and eighty percent of the inner surface area of the hard shell 32. In these embodiments, the spacer layer defines air gaps located between said hard outer shell 32 and said foam layer 35. The spacer layer 34 should cover sufficient area between the hard shell 32 and the foam layer 35 so that upon external impact to the inner seat 30, the shell 32 does not directly come into contact with the foam layer 35. Regardless of the material and arrangement of the cushioning spacer layer 34, in one embodiment the cushioning material is affixed to the hard shell layer 32 and to the foam layer 35. Affixation can be done with glue, Velcro or any other affixation means.

Cushioning spacer layer 34 is also provided with a series of slots 34b corresponding to slots 39a-39e of the flexible hard outer shell layer 32 for receiving the harness straps.

In one embodiment the foam layer 35 is a substantially continuous uniform layer interrupted only by slots 35a for the belts of the harness 50. The foam may be an elastomeric, cellular foam or any other desirable foam. In one embodiment, the foam layer 35 is comprised of closed cell polyolefin foam. In another embodiment, the foam layer is comprised of polyethylene foam which may be a high density polyethylene foam. By way of example and not by way of limitation, the foam layer may be between 3 mm and 13 mm thick, although it may be thinner or thicker. By way of example, and not by way of limitation, the foam layer may have a density of between 3.4 lbs/ft$^3$ (approximately 0.016 g/cm$^3$) and 25 lbs/ft$^3$ (approximately 0.4 g/cm$^3$), although it may be more dense or less dense.

All dimensions of the inner seat 30 are generally chosen to be smaller than the dimensions of the shell 20. Thus, inner seat 30 is suspended substantially within the shell 20 and generally protected by the shell 20.

The suspension system 40 functions to suspend the inner seat 30 relative to the outer shell 20 and to thereby act as a shock absorber between the shell 20 and the seat 30. In one embodiment, the suspension system 40 is a seven point suspension system with seven webs or belts 40a-40g. Some or all of the webs or belts 40a-40g may be the same length. Thus, by way of example only, belts 40a-40f may each be between approximately 2 cm and 5 cm in length, while belt 40g may be between 30 cm and 50 cm in length. Belt 40g is shown as extending through slots 38g and 38h in the buttocks area of the outer seat layer 32 and attaching to sides 20a and 20b of the shell 20 at slots 24g, 24h. Of course, other lengths may be used. If desired, belt 40g may be attached to the back wall 20c of the shell 20. In one embodiment, the belts extend through the slots 24a-24h in the shell 20 and the slots 38a-38h in the inner seat 30 and are doubled over at each end and sewn at each end to prevent removal. In another embodiment, the ends of the each belt extend around a stick or other object and are sewn so that the ends are to thick to remove through the slots. The webs or belts may be formed from a thick web of strong material such as polyester or nylon.

In one embodiment the harness 50 is a five-point harness as is known in the art. The harness 50 includes belt(s) 52 such that a central (crotch) belt or strap extends through slot 39a of seat 30, a lap belt extends through slots 39b, 39c of the seat 30, and shoulder belts extend through slots 39d and 39e of seat. Buckles and latches 54 may be provided with a push button 55 that permits release of the buckles. Guard pads 56a, 56b, 56c may be provided on the crotch and shoulder belts, and a clip 58 coupling the shoulder belts may be provided. The entire harness system 50 may be formed from standard materials and may constitute a standard five-point harness system that acts to keep the passenger in the seat 30. As will be appreciated, the belt(s) of the harness extend through slots in the layers of seat 30 and extend around the front and backside of the seat 30, but are not attached directly to the seat 30. The belt(s) 52 are optionally adjustable in length.

Optional handle 60 is attached by support mechanisms 66 to respective sides 20a, 20b of the shell 20. Handle 60 may swivel relative to support mechanisms 66 as is known in the art.

The embodiments of the car seat described with reference FIGS. 1-5 provide a highly protective, safe, and strong car seat system. In particular, because of the suspension system, in case the car in which the car seat is anchored is in an accident that causes sudden acceleration and/or deceleration of the car, force that is applied to the shell which is anchored to the car is not transferred to the inner seat and is therefore not applied to the occupant of the seat. More particularly, in the case of an accident, regardless of the direction in which the seat is facing and regardless of whether the result is a sudden acceleration and/or deceleration, the inner seat will move inside the shell, and the suspension system will absorb some, much, or all of the energy. The inner seat will swing inside the shell to the extent allowed by the belts of the suspension system (it being appreciated that the fabric or leather covering will easily comply). In addition, should the force be significant enough to cause the inner seat and shell to contact each other (at the optional foam pads on the inside of the shell), the construction of the inner seat with its foam spacer layer located between a hard outer layer and an inside foam layer is energy absorbing. Thus, some, most, or all of the energy that is transferred from the shell to the inner seat will be absorbed by the seat itself rather than transferred to the occupant of the seat. Furthermore, should the accident cause disclocation of the interior of the car or should an object hit the shell of the car seat, the shell is of extremely high strength and will remain structurally intact in almost all circumstances. Thus, the occupant of the car seat will not be crushed and will be protected by the foam padding of the seat. Further yet, it should be appreciated that the described car seat system will be light in weight (e.g., under 4 kg; and possibly around 3 kg).

FIG. 6 provides an alternate embodiment of a car seat 110 that is similar to car seat 10 of FIGS. 1-5, with similar elements numbered similarly but increased by "100". Car seat 110 includes an outer protective shell 120, an inner seat 130, a suspension system 140 and a harness 150. The protective shell 120 is adapted as described below to be strapped or anchored to a car frame (not shown). The inner seat 130 is connected to the protective shell 120 by the suspension system 140 such that the inner seat can move (float) a small amount relative to the protective shell 120 as described below. Thus, the shell 120 provides support for the seat 130 (via the suspension system 140) but is not rigidly attached thereto. The harness 150 is attached to the inner seat 30 and not to the outer protective shell 120. A handle 160 connected to the shell 120 is optionally provided.

The outer protective shell 120 can be made from the same material as shell 20 of FIGS. 1-5. Shell 120 provides side and back walls 120a-120c and a front wall or slat 120d that connects the side walls 120a, 120b at the front of the car seat. The back wall 120c provides a high back compared to the front wall 120d which is low and short. The side walls are contoured to extend from the back to the front. The front, back and side walls provide an upper edge 121 to which or over which a seat cover may be attached as described hereinafter.

As seen in FIGS. 1-5, the side walls 120a, 120b define fore and aft slots 122a, 122b, 122c (one more slot not shown) for receiving a seat belt therethrough, thereby permitting the car seat 110 to be strapped in facing forwards or backwards. In addition, or alternatively, a belt 162 is provided having one end attached to the shell 120 and a hook 163 located at the other end. The hook 163 may be used to connect to the frame of the car (not shown) located under the car's seat cushion (not shown). In another embodiment, the shell 120 may be adapted to rigidly connect to a separate base that can be strapped or anchored in place in the car.

Shell 120 also defines a series of slots 124 for receiving the belts 140 (belts 140a-140f shown; one belt not shown) of the suspension system 140. Seven slots are provided, including two slots each in side walls 120a, 120b, a single slot in the front wall 120d of the car seat, a single slot in the top of the back wall 120c, and a single slot in the bottom of the back wall 120c. Belts 140 couple the shell 120 to the inner seat 130.

Shell 120 also defines holes, slots, or surfaces for receiving a connection mechanism or support 166 for a handle 160. Also, a plurality of padding elements 127 are spaced around the inside surface 120e of the shell 120. The padding elements 127 are located such that should the shell 120 be subjected to significant forces and movement relative to the seat 130, the padding elements 127 will contact the seat 130 and largely prevent the inside surface 120e of the shell 120 from contacting the seat 130. The padding elements 127 may be formed from the same materials discussed above with reference to padding elements 27 of FIGS. 1-5.

The inner seat 130 is scooped in shape with a relatively high back, a deep seat area (for the buttocks), and a slightly rising surface for the thighs and legs. The inner seat 30 is a protective seat made from a multi-layered construction. The inner seat includes a hard outer shell 132, and an attached fabric or leather layer 139 that incorporates foam pillows 135a therein. The fabric or leather layer 139 extends beyond the inner seat 130 and attaches to the edge 121 of the shell 120 but does not inhibit seat 130 from moving relative to the shell 120. The inner seat 130 also defines a plurality of (e.g., seven) slots 138 for receiving belts of the suspension system 140, and a series of slots 139 for receiving belt(s) 152 of the harness system 150. The hard outer shell 132 of inner seat 130 may be formed from the same materials discussed above with reference to shell 32 of FIGS. 1-5.

The suspension system 140 functions to suspend the inner seat 130 relative to the outer shell 120 and to thereby act as a shock absorber between the shell 120 and the seat 130. The suspension system 140 is a seven point suspension system with seven webs or belts (six shown 140a-140f). The belts may be configured and formed in a manner such as belts 40a-40g of FIGS. 1-5.

The harness 150 is a five-point harness system with belt(s) 152 that include a central (crotch) belt attached through slot 139a of seat 130 and shoulder belts and lap belts attached through similar slots of the seat. The entire harness system 150 may be formed from standard materials. As will be appreciated, the belt(s) of the harness extend through slots in the layers of seat 130 and extend around the front and backside of the seat 130, but are not attached directly to the seat 130. The belt(s) 152 are optionally adjustable in length.

Optional handle 160 is attached by support mechanisms 166 to respective sides 120a, 120b of the shell 120. Handle 160 may swivel relative to support mechanisms 166 as is known in the art.

The embodiments described with reference to FIG. 6 provides a highly protective, safe, and strong car seat system similar to that of the embodiments described with reference to FIGS. 1-5, although it is noted that the inner seat of FIG. 6 itself is not as energy absorbent as the inner seats described with reference to FIGS. 1-5.

There have been described and illustrated herein several embodiments of a car seat. While particular embodiments have been described, it is not intended that the claims be limited thereto, as it is intended that the claims be as broad in scope as the art will allow and that the specification be read likewise. Thus, while particular materials for shell have been disclosed, it will be appreciated that other materials may be used as well provided they supply sufficient strength for the suspension system and structural integrity for the system. Similarly, while particular types of materials have been disclosed for the inner seat layers, it will be understood that other materials can be used. Further, while the suspension system has been described as being comprised of belts or webs, it will be be appreciated that other or additional suspension elements may be utilized. It will therefore be appreciated by those skilled in the art that yet other modifications could be made without deviating from the spirit and scope of the claims.

What is claimed is:

1. A car seat for an occupant, comprising:
 a) an outer protective shell;
 b) an inner seat;
 c) a suspension system coupling and permitting relative movement between said inner seat and said outer protective shell, said suspension system suspending said inner seat substantially within said outer protective shell;
 d) a harness adapted to hold the occupant in the inner seat and not attached to the outer protective shell; and
 e) a plurality of padding elements wherein,
   said outer protective shell has an inner surface and said plurality of padding elements are located on said inner surface of said outer protective shell.

2. A car seat according to claim 1, further comprising:
 f) a handle connected to said outer protective shell, wherein said outer protective shell has two side walls, a back wall and a front wall and said handle is connected to said two side walls.

3. A car seat according to claim 1, wherein:
 said outer protective shell comprises at least one of carbon fibers and aramid fibers.

4. A car seat according to claim 3, wherein:
 said outer protective shell has a plurality of layers, at least two of said plurality of layers comprised of said at least one of carbon fibers and aramid fibers.

5. A car seat according to claim 1, wherein:
 said outer protective shell defines a plurality of slots for receiving a seat belt in at least two different locations.

6. A car seat according to claim 1, further comprising:
an anchor connected to said outer protective shell, said anchor including a web.

7. A car seat according to claim 1, wherein:
said shell is between 40 and 70 cm wide, 20 and 60 cm deep, and 50 and 80 cm high.

8. A car seat for an occupant, comprising:
a) an outer protective shell;
b) an inner seat;
c) a suspension system coupling and permitting relative movement between said inner seat and said outer protective shell, said suspension system suspending said inner seat substantially within said outer protective shell; and
d) a harness adapted to hold the occupant in the inner seat and not attached to the outer protective shell, wherein said suspension system comprises a plurality of webs.

9. A car seat according to claim 8, wherein:
said outer protective shell has two side walls, a back wall and a front wall, and
said plurality of webs includes two webs extending from a first of said two side walls to said seat, two webs extending from a second of said two side walls to said seat, one web extending from said front wall to said seat, and two webs extending from said back wall to said seat.

10. A car seat according to claim 9, wherein:
said two webs extending from each of said two side walls are between 2 mm and 5 mm in length.

11. A car seat according to claim 8, wherein:
said inner seat is scooped in shape and has a relatively high back, a deep seat area extending from said back, and a slightly rising forward surface extending from said deep seat area, and said harness includes at least one belt including a central belt portion extending from said slightly rising forward surface, and two shoulder belt portions each extending from said relatively high back.

12. A car seat for an occupant, comprising:
a) an outer protective shell;
b) an inner seat;
c) a suspension system coupling and permitting relative movement between said inner seat and said outer protective shell, said suspension system suspending said inner seat substantially within said outer protective shell;
d) a harness adapted to hold the occupant in the inner seat and not attached to the outer protective shell, wherein
said inner seat comprises a plurality of layers including a hard outer layer with an inner surface, a substantially uniform inner foam layer with an outer surface facing said inner surface of said hard layer, and a cushioning spacer layer between said inner surface of said hard outer layer and said outer surface of said cushioning spacer layer, wherein said cushioning spacer layer covers substantially less than the entire of said inner surface of said hard outer layer and substantially less than the entire of said outer surface of said inner foam layer and defines a plurality of air gaps between hard outer layer and said inner foam layer.

13. A car seat according to claim 12, wherein:
said plurality of layers of said inner seat comprises a cover layer extending over said inner foam layer and attached to said protective shell.

14. A car seat according to claim 12, further comprising:
a seat cover extending over said inner seat and at least a portion of a rim of said outer protective shell.

15. A car seat for an occupant and adapted for use on a seat of a car, comprising:
a) an outer protective shell formed from at least one of carbon fiber and aramid fiber, said outer protective shell including two side walls, a back wall and a front wall;
b) an inner seat protected by said outer protective shell and formed from a plurality of layers including at least one foam layer;
c) a suspension system coupling and permitting relative movement between said inner seat and said outer protective shell, said suspension system having at least seven webs suspending said inner seat substantially within said outer protective shell;
d) a harness adapted to hold the occupant in the inner seat and not attached to the outer protective shell, said harness including at least one belt.

16. A car seat according to claim 15, further comprising:
e) a handle connected to said two side walls of said outer protective shell; and
f) an anchor connected to said outer protective shell, said anchor including a web.

17. A car seat according to claim 15, wherein:
said inner seat is scooped in shape and has a relatively high back, a deep seat area extending from said back, and a slightly rising forward surface extending from said deep seat area, and said at least one belt including a central belt portion extending from said slightly rising forward surface, and two shoulder belt portions extending from said relatively high back.

18. A car seat according to claim 17, wherein:
said inner seat comprises a plurality of layers including a hard outer layer with an inner surface, a substantially uniform inner foam layer with an outer surface facing said inner surface of said hard layer, and a cushioning spacer layer between said inner surface of said hard outer layer and said outer surface of said cushioning spacer layer, wherein said cushioning spacer layer covers substantially less than the entire of said inner surface of said hard outer layer and substantially less than the entire of said outer surface of said inner foam layer and defines a plurality of air gaps between hard outer layer and said inner foam layer.

19. A car seat according to claim 15, wherein:
said car seat weighs less than 4 kg.

* * * * *